United States Patent
Tanaka et al.

(10) Patent No.: US 12,129,627 B2
(45) Date of Patent: Oct. 29, 2024

(54) WORK VEHICLE

(71) Applicant: HITACHI CONSTRUCTION MACHINERY CO., LTD., Tokyo (JP)

(72) Inventors: Shinichiro Tanaka, Akashi (JP); Hiroyasu Kodera, Kobe (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 435 days.

(21) Appl. No.: 17/638,290

(22) PCT Filed: Mar. 12, 2021

(86) PCT No.: PCT/JP2021/010140
§ 371 (c)(1),
(2) Date: Feb. 25, 2022

(87) PCT Pub. No.: WO2021/193155
PCT Pub. Date: Sep. 30, 2021

(65) Prior Publication Data
US 2022/0333347 A1    Oct. 20, 2022

(30) Foreign Application Priority Data
Mar. 27, 2020   (JP) .................. 2020-058338

(51) Int. Cl.
*E02F 9/20* (2006.01)
*B60T 7/04* (2006.01)
(Continued)

(52) U.S. Cl.
CPC ............ *E02F 9/2083* (2013.01); *B60T 7/042* (2013.01); *B60T 8/326* (2013.01); *B60T 8/361* (2013.01);
(Continued)

(58) Field of Classification Search
CPC ....... E02F 9/2083; E02F 9/2004; E02F 9/264; E02F 9/26; E02F 3/283; B60T 7/042;
(Continued)

(56) References Cited

U.S. PATENT DOCUMENTS

2021/0131065 A1*  5/2021  Myers .................... B60Q 9/008

FOREIGN PATENT DOCUMENTS

| JP | 2001130439 A | 5/2001 |
| JP | 2013248931 A | 12/2013 |

(Continued)

OTHER PUBLICATIONS

International Search Report of PCT/JP2021/010140 dated May 8, 2021.

*Primary Examiner* — Jacob M Amick
(74) *Attorney, Agent, or Firm* — MATTINGLY & MALUR, PC

(57) ABSTRACT

Provided is a work vehicle capable of satisfying a user's demand to brake performance in a flexible manner. A wheel loader 1 comprises a controller 5 storing a plurality of control characteristics each of which is set such that a brake valve control pressure Pi of a solenoid proportional valve 45 increases as a pedal angle θ of a brake pedal 43 increases, and under the condition where a pedal angle θ is equal to or less than a predetermined pedal angle θ, an increase rate of the brake valve control pressure Pi with respect to the pedal angle θ varies. In a case where the pedal angle θ detected by a potentiometer 33 is equal to or less than the predetermined pedal angle θth, the controller 5, calculates the brake valve control pressure Pi based on the selected one control characteristic.

7 Claims, 14 Drawing Sheets

(51) Int. Cl.
  *B60T 8/32* (2006.01)
  *B60T 8/36* (2006.01)
  *B60T 8/58* (2006.01)
  *B60T 8/94* (2006.01)
  *B60T 13/68* (2006.01)
  *E02F 3/28* (2006.01)
  *E02F 9/26* (2006.01)
  *B60T 13/14* (2006.01)

(52) U.S. Cl.
  CPC *B60T 8/58* (2013.01); *B60T 8/94* (2013.01); *B60T 13/686* (2013.01); *E02F 9/2004* (2013.01); *E02F 9/264* (2013.01); *B60T 13/148* (2013.01); *B60T 2220/04* (2013.01); *B60T 2250/02* (2013.01); *B60T 2250/04* (2013.01); *B60T 2270/402* (2013.01); *B60T 2270/404* (2013.01); *B60T 2270/82* (2013.01); *E02F 3/283* (2013.01); *E02F 9/26* (2013.01)

(58) Field of Classification Search
  CPC . B60T 8/326; B60T 8/361; B60T 8/58; B60T 8/94; B60T 13/686; B60T 13/148; B60T 2220/04; B60T 2250/02; B60T 2250/04; B60T 2270/402; B60T 2270/404; B60T 2270/82
  See application file for complete search history.

(56) References Cited

FOREIGN PATENT DOCUMENTS

| | | | |
|---|---|---|---|
| JP | 2016223462 | A | 12/2016 |
| JP | 6124840 | B2 | 5/2017 |
| JP | 2017177984 | A | 10/2017 |

* cited by examiner

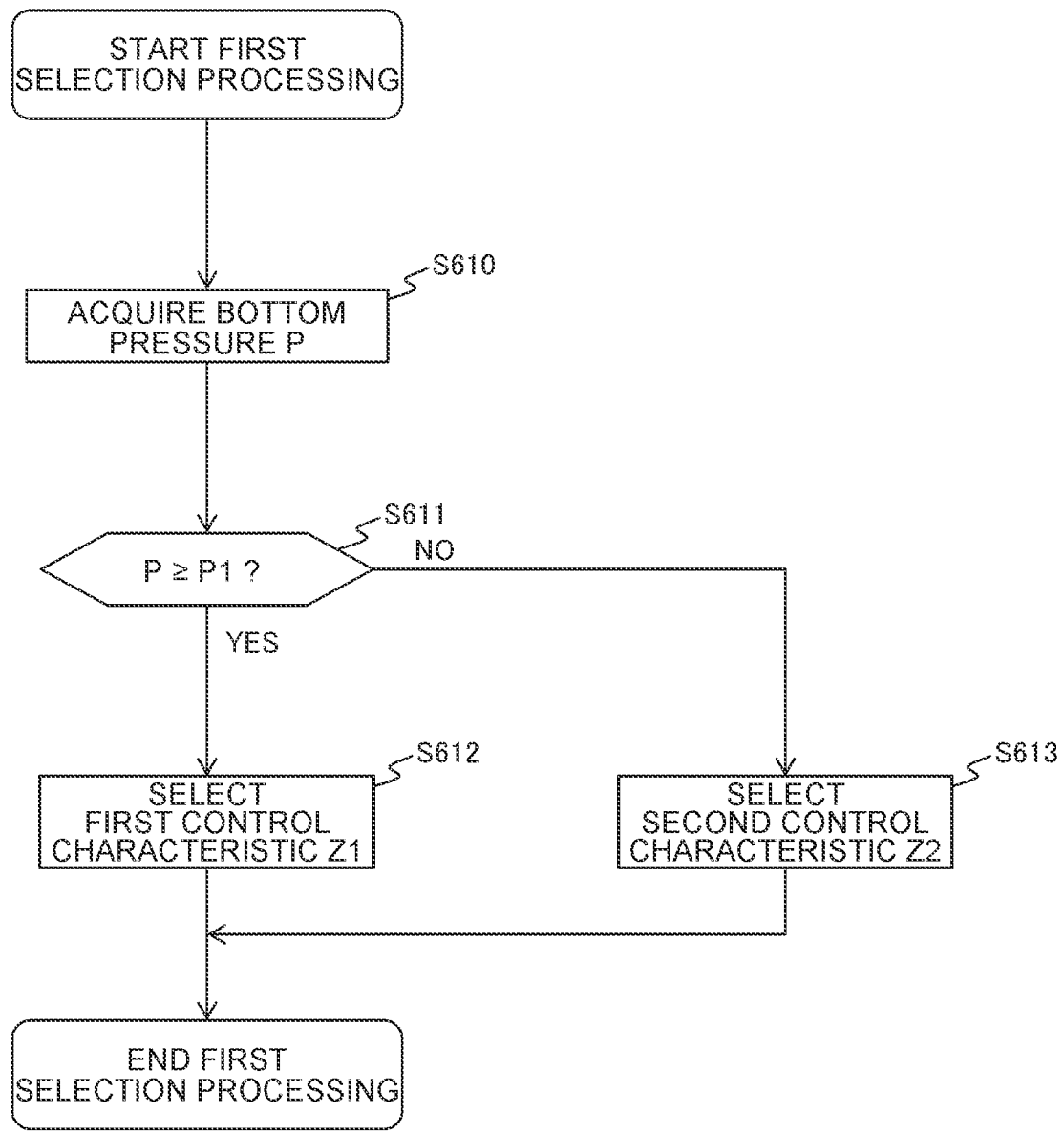

WORK VEHICLE

TECHNICAL FIELD

The present invention relates to a work vehicle equipped with an electronic brake control system.

BACKGROUND ART

A work vehicle equipped with a work device, such as a wheel loader, performs a dump approach operation to approach a dump truck, with load materials being in the work device. In this dump approach operation, it is necessary to prevent collision with the dump truck and load spillage by suppressing the vehicle speed while moving the work device upward. In this regard, the brake performance at low speed becomes important for the work vehicle, and therefore, the work vehicle needs to control the brake in detail.

For example, Patent Literature 1 discloses a brake control device for a vehicle, comprising: an operation section configured to output an operation signal for operating a brake of the vehicle; an solenoid fluid pressure control valve for the brake which is disposed in a brake working fluid pressure circuit for supplying a fluid pressure to the brake; and a control section configured to output a control signal to the solenoid fluid pressure control valve for the brake based on the operation signal from the operation section to control the brake to be actuated or released.

CITATION LIST

Patent Literature

Patent Literature 1: JP-A-2001-130439

SUMMARY OF INVENTION

Technical Problem

The required brake performance during the dump approach operation differs depending on a specification of a vehicle body, the weight of load materials, or the like. However, since the brake control device disclosed in Patent Literature 1 is configured such that the control section merely controls the brake based on the operation signal from the operation section, in order to satisfy the brake performance needed by a user, its hardware configuration has to be changed, for example, by mounting with a special brake. However, changing the hardware configuration increases the number of parts and/or requires special setting for each vehicle body, and accordingly, it is difficult to satisfy the user's demand in a flexible manner.

Therefore, an object of the present invention is to provide a work vehicle capable of satisfying a user's demand to brake performance in a flexible manner.

Solution to Problem

In order to achieve the object described above, the present invention provides

Advantageous Effects of Invention

According to the present invention, it is possible to satisfy a user's demand to brake performance in a flexible manner. The problems, configurations, and advantageous effects other than those described above will be clarified by explanation of the embodiments below.

BRIEF DESCRIPTION OF DRAWINGS

FIG. 9A is a flowchart illustrating a flow of one aspect of the first selection processing.

DESCRIPTION OF EMBODIMENTS

Hereinafter, as an aspect of work vehicles according to each embodiment of the present invention, for example, a wheel loader for performing the loading work by excavating such as earth and sand and minerals and loading the excavated materials into a dump truck will be described.

<Configuration of Wheel Loader 1>

Firstly, a configuration of a wheel loader 1 will be described with reference to FIG. 1.

Figure 1:
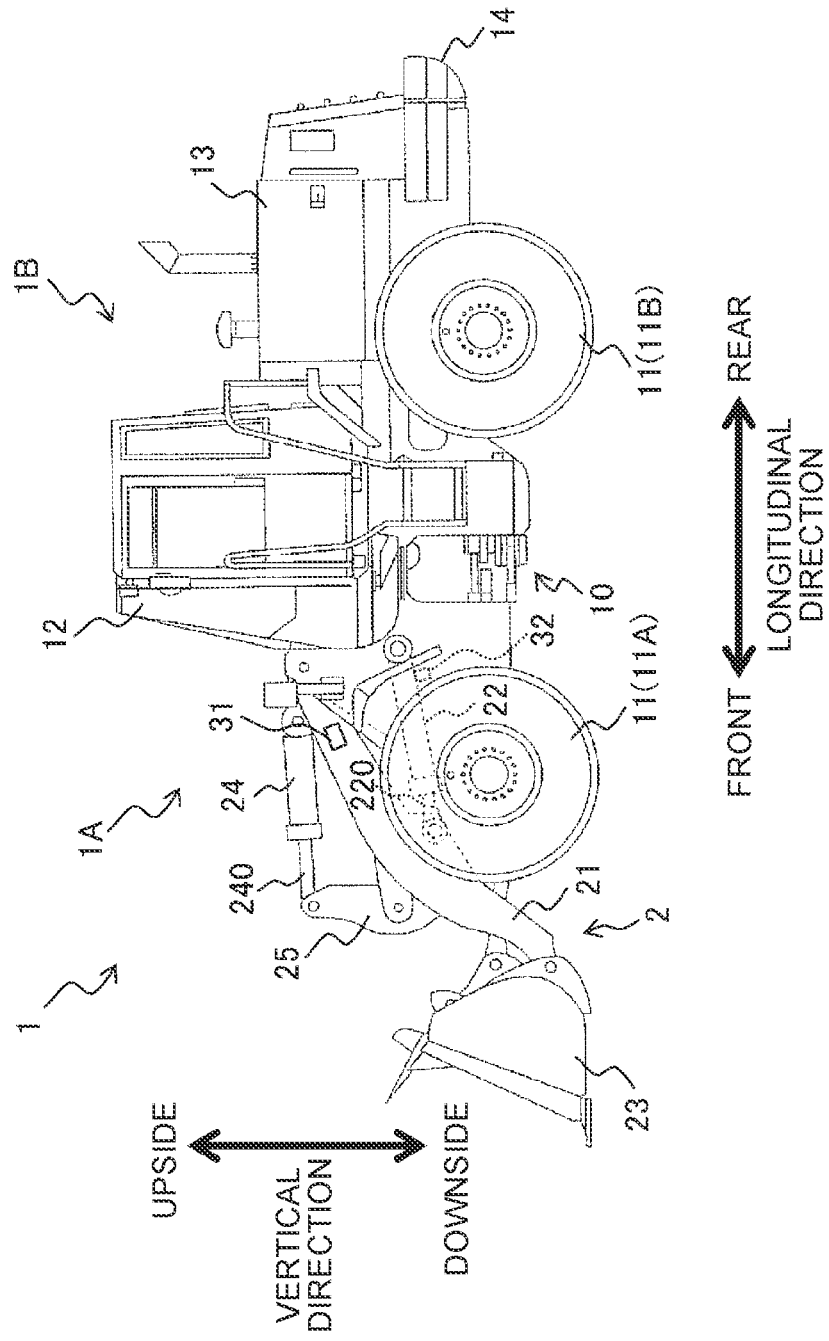
FIG. 1 is a side view of an appearance of a configuration example of a wheel loader according to each embodiment of the present invention.

FIG. 1 is a side view of an appearance of a configuration example of the wheel loader 1 according to each embodiment of the present invention.

The wheel loader 1 is an articulated type work vehicle which is swiveled on a central portion of the vehicle body and steered thereby. Specifically, a front frame 1A that is the front part of the vehicle body and a rear frame 1B that is the rear part of the vehicle body are connected to each other by a center joint 10 to swivel in the left and right direction so that the front frame 1A is bent in the left and right direction with respect to the rear frame 1B.

The wheel loader 1 includes four wheels 11. Two wheels 11 among them are provided, as front wheels 11A, on the left and right sides of the front frame 1A, respectively, and the remaining two wheels 11 are provided, as rear wheels 11B, on the left and right sides of the rear frame 1B, respectively. FIG. 1 illustrates, among the four wheels 11, only the front wheel 11A and the rear wheel 11B provided on the left side. Note that the number of the wheels 11 provided on the vehicle body is not particularly limited.

On a front portion of the front frame 1A, a work device 2 provided to perform the loading work including operations of moving and loading load materials is attached. The work device 2 includes a lift arm 21 whose proximal end portion is attached to the front frame 1A, two lift arm cylinders 22 for driving the lift arm 21 by the extension and contraction of each rod 220, a bucket 23 attached to the distal end portion of the lift arm 21, a bucket cylinder 24 for driving the bucket 23 by the extension and contraction of a rod 240, and a bell crank 25 rotatably connected to the lift arm 21 and forming a link mechanism between the bucket 23 and the bucket cylinder 24. Although the two lift arm cylinders 22 are arranged side by side in the lateral direction of the vehicle body, FIG. 1 illustrates only one of the lift arm cylinders 22 which is disposed on the left side by a broken line.

When each bottom chamber of the two lift arm cylinders 22 is supplied with hydraulic oil and thus each rod 220 extends, the lift arm 21 rotationally moves in the upward direction with respect to the front frame 1A. When each rod chamber of the two lift arm cylinders 22 is supplied with hydraulic oil and thus each rod 220 contracts, the lift arm 21 rotationally moves in the downward direction with respect to the front frame 1A. The height of the lift arm 21 can be calculated based on an angle of the lift arm 21, and thus an angle sensor 31 as a height sensor of the lift arm 21 is attached to the lift arm 21.

When the bottom chamber of the bucket cylinder 24 is supplied with hydraulic oil and thus the rod 240 extends, the bucket 24 rotationally moves in the upward direction (tilt) with respect to the lift arm 21. When the rod chamber of the bucket cylinder 24 is supplied with hydraulic oil and thus the rod 240 contracts, the bucket 24 rotationally moves in the downward direction (dump) with respect to the lift arm 21.

The weight of the load materials, such as earth and sand and minerals, loaded in the bucket 23 can be detected based on the bottom pressure of the lift arm cylinders 22, and thus a bottom pressure sensor 32 as a load sensor is attached to one of the bottom chamber sides of the lift arm cylinders 22. Note that it is sufficient to attach the bottom pressure sensor 32 to any one of the two lift arm cylinders 22. FIG. 1 illustrates the bottom pressure sensor 32 attached to the left side lift arm cylinder 22 by a broken line.

The rear frame 1B includes an operator's cab 12 provided for an operator to get in, a machine room 13 for accommodating therein respective devices necessary for driving the wheel loader 1, and a counterweight 14 for balancing the vehicle body with the work device 2 to prevent the vehicle body from tilting. On the rear frame 1B, the operator's cab 12 is provided in the front thereof, the counterweight 14 is provided in the rear thereof, and the machine room 13 is provided between the operator's cab 12 and the counterweight 14.

<Movements of Wheel Loader 1 During Loading Work>

Next, movements of the wheel loader 1 during the loading work will be described with reference to FIG. 2 and FIG. 3. The wheel loader 1 performs an excavation operation and a loading operation by a method called "V-shape loading".

Figure 2:
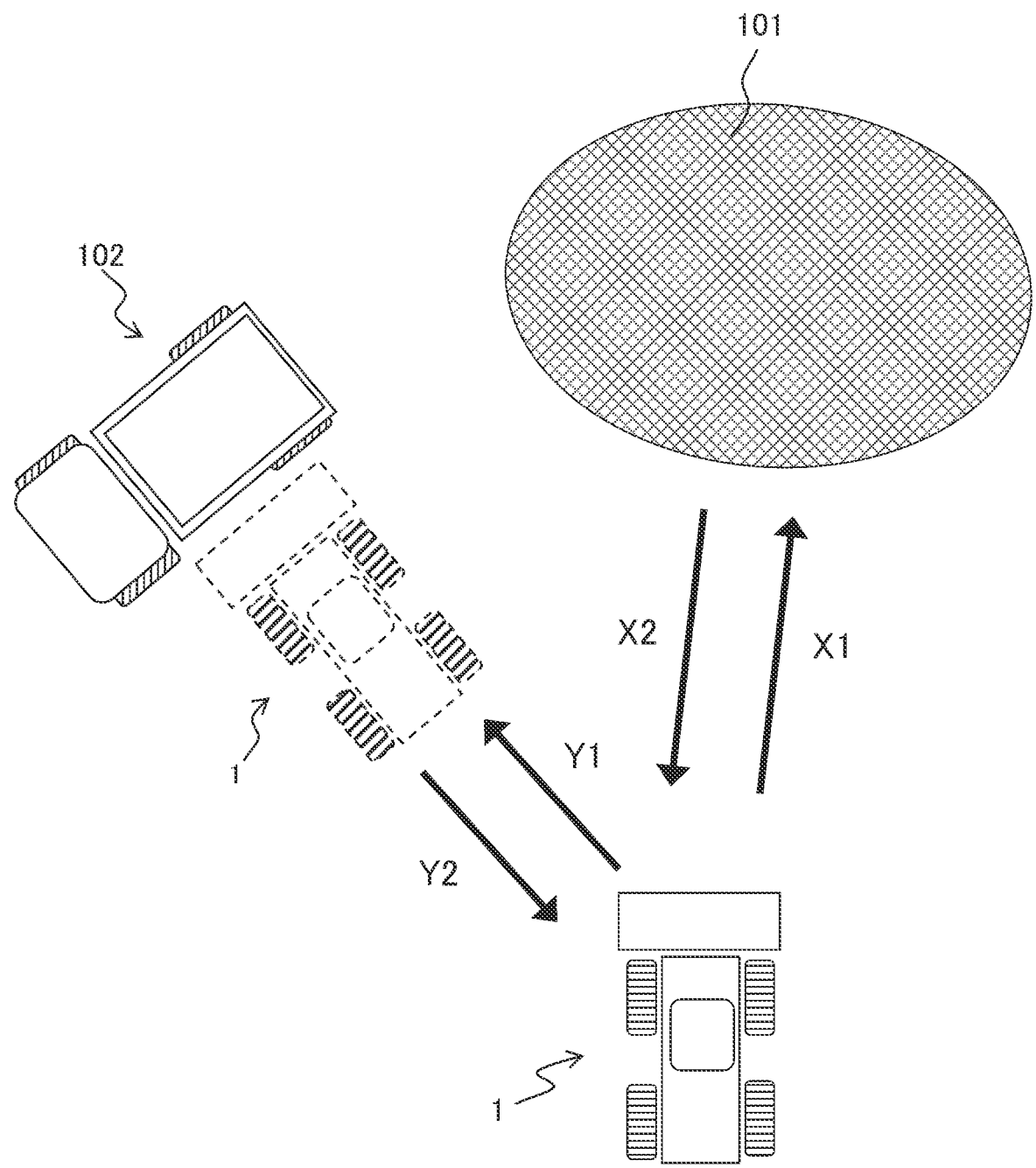
FIG. 2 explains the V-shape loading performed by a wheel loader.

FIG. 2 explains the V-shape loading performed by the wheel loader 1. FIG. 3 explains the movements of the wheel loader 1 during the dump approach operation.

Firstly, the wheel loader 1 moves forward toward a pile 101 which is an object to be excavated (arrow X1 illustrated in FIG. 2), and performs an excavation operation by making the bucket 23 thrust into the pile 101. Upon completing the excavation operation, the wheel loader 1 temporarily moves backward to the original position (arrow X2 illustrated in FIG. 2).

Next, the wheel loader 1 moves forward toward a dump truck 102 which is a loading destination, stops in front of the dump truck 102, and performs a loading operation to load the load materials in the bucket 23 into the dump truck 102 (arrow Y1 illustrated in FIG. 2). This movement of the wheel loader 1 during the loading operation can be referred to as a "dump approach movement". Note that FIG. 2 illustrates the wheel loader 1 which has stopped in front of the dump truck 102 by a broken line.

Figure 3:
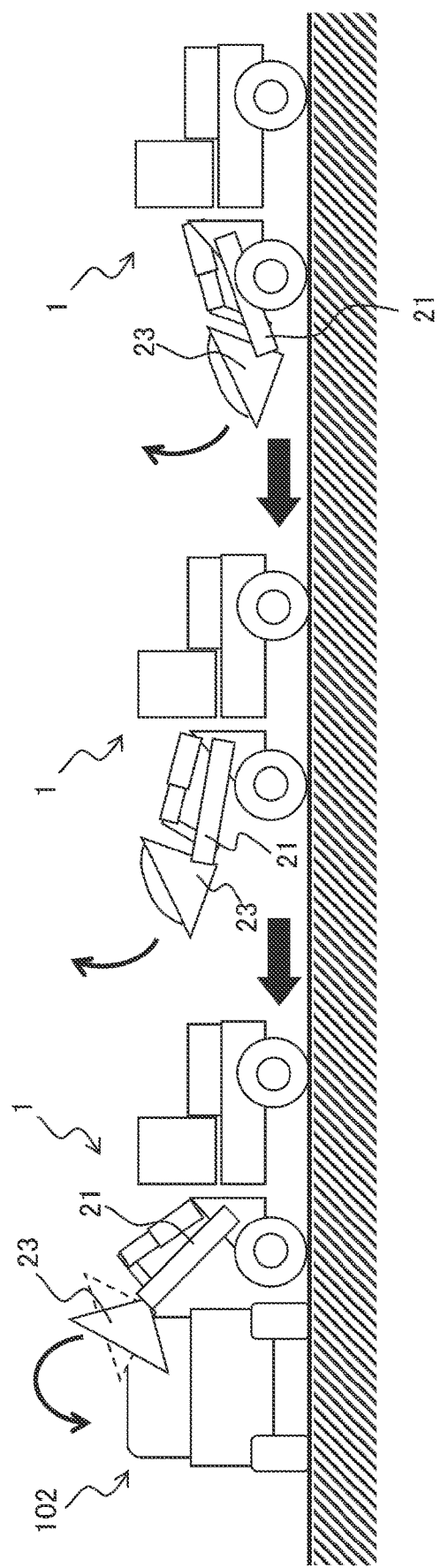
FIG. 3 explains movements of a wheel loader during a dump approach operation.

In this dump approach operation, as illustrated in FIG. 3, firstly, the operator fully steps on an accelerator pedal (full acceleration), and also performs a lifting operation of the lift arm 21 (a state on the right side of FIG. 3).

Next, the operator causes the lift arm 21 to further move in the upward direction while keeping the full acceleration state, and at the same time, adjusts the vehicle speed by stepping on a brake pedal a little so as to prevent the vehicle body from colliding with the dump truck 102 or prevent load collapse (a state on the center of FIG. 3).

Then, the operator further steps on the brake pedal to make the vehicle body stop in front of the dump truck 102, and performs a dump operation of the bucket 23 (a state on the left side of FIG. 3), whereby the load materials in the bucket 23 is loaded into the dump truck 102.

As illustrated in FIG. 2, upon completing the loading operation, the wheel loader 1 moves backward to the original position (arrow Y2 illustrated in FIG. 2). In this way, the wheel loader 1 performs the excavation operation and the loading operation while reciprocating in a V-shape between the pile 101 and the dump truck 102.

Since the wheel loader 1 is required to suppress the vehicle speed by applying the brake while moving the lift arm 21 in the upward direction, in particular, during the dump approach operation, the brake performance at low speed is important for the wheel loader 1. In the following, a brake control system of the wheel loader 1 will be described for each embodiment.

First Embodiment

A brake control system according to a first embodiment will be described with reference to FIG. 4 to FIG. 13.
(Hardware Configuration of Brake Control System)

Firstly, a hardware configuration of the brake control system of the wheel loader 1 will be described with reference to FIG. 4.

Figure 4:
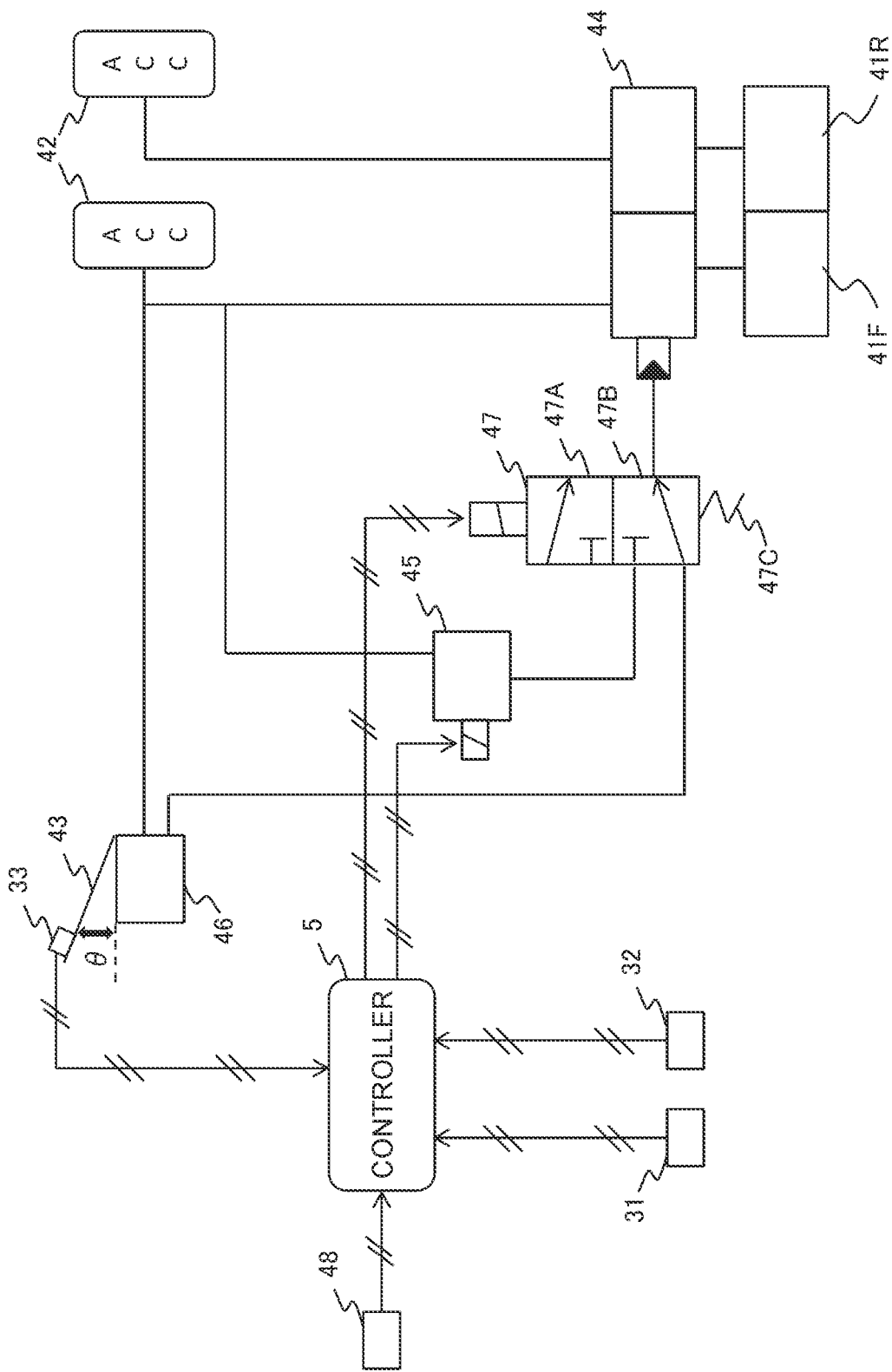
FIG. 4 is a system configuration diagram illustrating a configuration example of a brake control system according to the first embodiment.

FIG. 4 is a system configuration diagram illustrating a configuration example of the brake control system according to the first embodiment.

The brake control system of the wheel loader 1 includes brake devices 41F, 41R configured to apply a brake force to the front wheels 11A and the rear wheels 11B (four wheels 11), respectively, an accumulator 42 configured to accumulate pressurized oil, a brake pedal 43 for operating the brake devices 41F, 41R, a brake valve 44 configured to supply a control pressure to the brake devices 41F, 41R, respectively, a solenoid proportional valve 45 configured to output a control pressure (hereinafter, referred to as "brake valve control pressure") to the brake valve 44, a controller 5 configured to control the solenoid proportional valve 45, a hydraulic pilot valve 46 configured to generate a pilot pressure in accordance with a step-on amount of the brake pedal 43, and a solenoid switching valve 47 including two switching positions 47A, 47B.

In FIG. 4, the accumulator 42 is illustrated as a source of the hydraulic pressure which is a source of the control pressure output from the brake valve 44 and the solenoid proportional valve 45. The source of the hydraulic pressure is generally a hydraulic pump, on the other hand, the pressure oil accumulated in the accumulator 42 may be used. For example, in the event of an engine failure, the hydraulic oil accumulated in the accumulator 42 can be supplied to the braking devices 41F, 41R.

The brake pedal 43 is provided in the operator's cab 12 (see FIG. 1). A step-on amount of the brake pedal 43 can be detected based on a step-on angle θ of the brake pedal 43 (hereinafter, simply referred to as "pedal angle θ"), and thus a potentiometer 33 as a step-on amount sensor is attached to the brake pedal 43.

The brake valve 44 is arranged, in the present embodiment, on a position different from and separated away from the brake pedal 43 provided in the operator's cab 12, which is a position closer to an axle than the operator's cab 12. Arranging the brake valve 44 as above enables reduction of hydraulic vibration (hydraulic pulsation) transmitted from the brake valve 44 to the brake pedal 43, thereby making it possible to suppress discomfort that the operator feels due to transmission of the hydraulic vibration and noise caused by the hydraulic vibration. Furthermore, bringing the brake valve 44 closer to the axle improves response of the brake more than the case where the brake valve 44 is arranged near the operator's cab 12.

The solenoid switching valve 47 is configured to be switched, based on a switching command current to be output from the controller 5, between a first switching position 47A for guiding the brake valve control pressure from the solenoid proportional valve 45 to the brake valve 44 and a second switching position 47B for guiding the pilot pressure generated by the hydraulic pilot valve 46 to the brake valve 44. That is, the pilot pressure to be applied to the brake valve 44 is changed depending on the switching positions of the solenoid switching valve 47.

As described above, the brake performance at low speed is particularly important for the wheel loader 1, and therefore, the wheel loader 1 needs to control the brake in detail using the controller 5. In this case, the solenoid switching valve 47 is switched to the first switching position 47A so that the brake valve control pressure from the solenoid proportional valve 45 is applied to the brake valve 44.

On the other hand, in the case where the brake control by the controller 5 is not particularly necessary (the brake is to be applied directly by an operator's stepping-on operation of the brake pedal 43), for example, while the wheel loader 1 is traveling at medium to high speed, or in the case of disconnection of a signal line connecting the controller 5 and the solenoid proportional valve 45 or termination of the output of the command current from the controller 5, the solenoid switching valve 47 is switched to the second switching position 47B so that the pilot pressure generated by the hydraulic pilot valve 46 is applied to the brake valve 44. This allows the wheel loader 1 to apply the brake quickly with good responsiveness.

In the present embodiment, the solenoid switching valve 47 is switched to the first switching position 47A when a value of the switching command current output from the controller 5 becomes more than an urging force of a spring 47C mounted on the solenoid switching valve 47. Accordingly, in the case where the switching command current is not output to the solenoid switching valve 47 due to occurrence of an abnormality in an electric system including the controller 5 (switching command current=0), the solenoid switching valve 47 is switched to the second switching position 47B by the urging force of the spring 47C.

As described above, the wheel loader 1 does not depend only on the electronic brake control by the controller 5 but employs the brake control system using both the electronic brake control and the hydraulic brake control. As a result, even in the case where an abnormality occurs in the electric system including the controller 5, it is possible to operate the brake devices 41F, 41R without anxiety.

(Configuration of Controller 5)

Next, a configuration of the controller 5 will be described with reference to FIG. 5 to FIG. 7.

Figure 5:
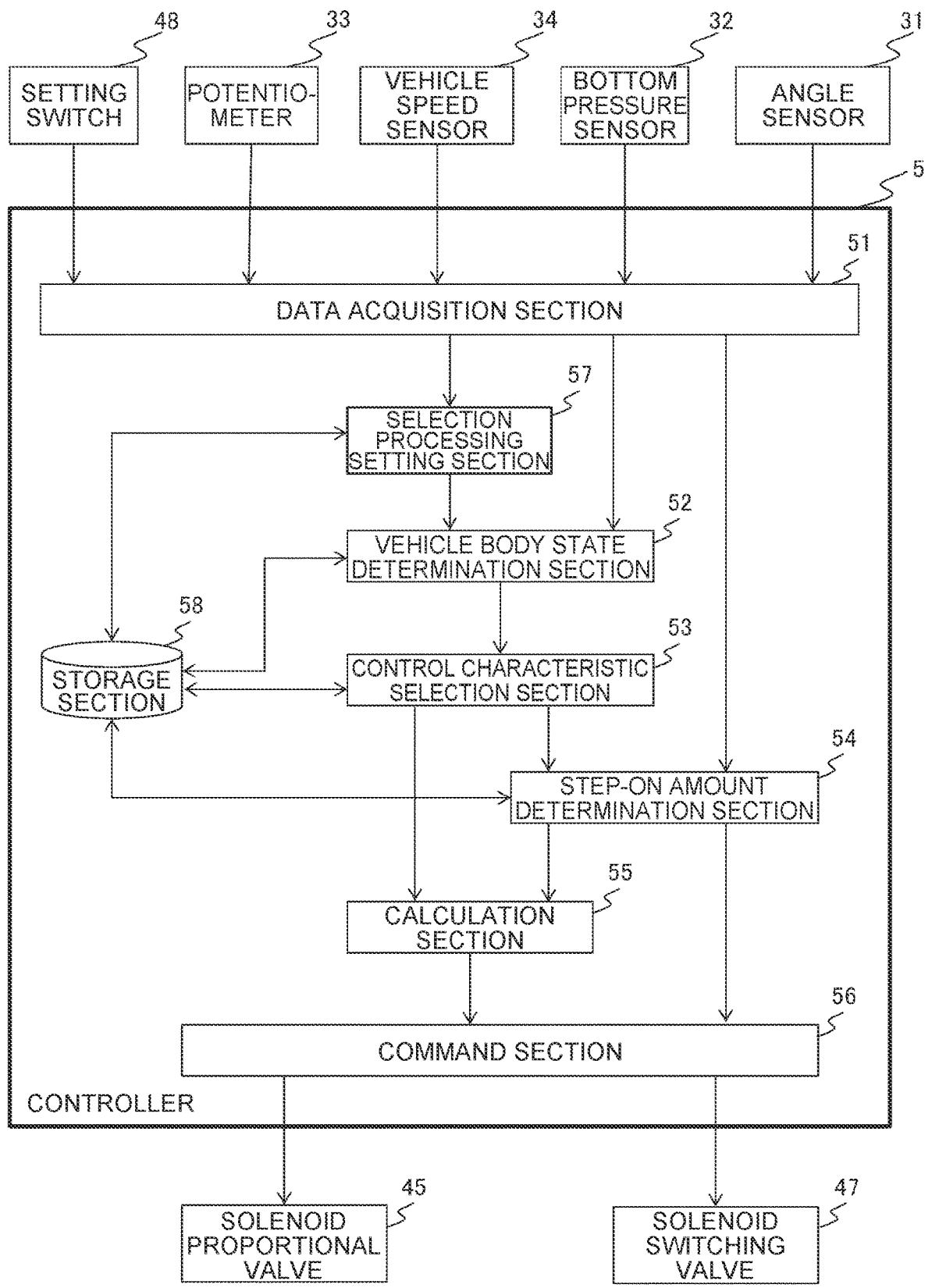
FIG. 5 is a function block diagram illustrating functions of a controller according to the first embodiment.

FIG. 5 is a function block diagram illustrating functions of the controller 5. FIG. 6 illustrates a graph showing a first control characteristic Z1 and a second control characteristic Z2 of the brake valve control pressure, which are the hydraulic brake control characteristic and the electronic brake control characteristic. FIG. 7 illustrates a graph showing a relation between an angle θ of the brake pedal 43 and a step-on force F of the brake pedal 43.

The controller 5 is configured such that a CPU, a RAM, a ROM, an HDD, an input I/F, and an output I/F are connected to each other via a bus. Then, various operation devices and various sensors such as the bottom pressure sensor 32, the potentiometer 33, and a vehicle speed sensor 34 are connected to the input I/F while the solenoid proportional valve 45 and the solenoid switching valve 47 are connected to the output I/F. Note that the vehicle speed sensor 34 is configured to detect the vehicle speed based on the rotational speed of an output shaft of a transmission.

In this hardware configuration, the CPU reads out a control program (software) stored in a recording medium such as the ROM, the HDD or an optical disc, and loads and executes the control program (software) on the RAM, whereby the control program and the hardware collaborate to implement the functions of the controller 5.

In the present embodiment, the controller 5 is described as a computer configured by a combination of software and hardware. However, the controller 5 is not limited thereto, and as one of the examples of configurations of other computers, an integrated circuit for implementing the functions of the control program executed on the side of the wheel loader 1 may be used.

The controller 5 stores a plurality of control characteristics each in which a correspondence relation of a brake valve control pressure Pi of the solenoid proportional valve 45 with respect to a pedal angle θ (step-on amount) of the brake pedal 43 is set.

Specifically, each of the plurality of control characteristics is set such that the brake valve control pressure Pi increases as the pedal angle θ of the brake pedal 43 increases, and also such that, under the condition where the pedal angle θ is equal to or less than a predetermined pedal angle θth (θ≤θth), an increase rate of the brake valve control pressure Pi of the solenoid proportional valve 45 with respect to the pedal angle θ varies. In the present embodiment, the controller 5 stores eight control characteristics including the first control characteristic Z1, the second control characteristic Z2, a third control characteristic Z3, a fourth control characteristic Z4, a fifth control characteristic Z5, a sixth control characteristic Z6, a seventh control characteristic Z7, and an eighth control characteristic Z8, however, the number of control characteristics to be stored in the controller 5 is not particularly limited.

Note that in the following, "the first control characteristic Z1, the second control characteristic Z2, the third control characteristic Z3, the fourth control characteristic Z4, the fifth control characteristic Z5, the sixth control characteristic Z6, the seventh control characteristic Z7, and the eighth control characteristic Z8" can be collectively referred to as "the first to eighth control characteristics Z1 to Z8".

The first to eighth control characteristics Z1 to Z8 are set such that at least in a range where the pedal angle θ is equal to or less than half the maximum pedal angle θmax (maximum step-on amount) of the brake pedal 43 (θ≤θmax/2), the increase rate of the brake valve control pressure Pi with respect to the pedal angle θ is set to vary. That is, the range where the pedal angle θ is equal to or less than the predetermined pedal angle θth includes the range where the pedal angle θ is equal to or less than half the maximum pedal angle θ (θ≤θmax/2) of the brake pedal 43, and this range corresponds to a range of the pedal angle θ at the time when the operator steps on the brake pedal 43 to suppress the vehicle speed (decelerate) during the dump approach operation of the wheel loader 1.

Figure 6:
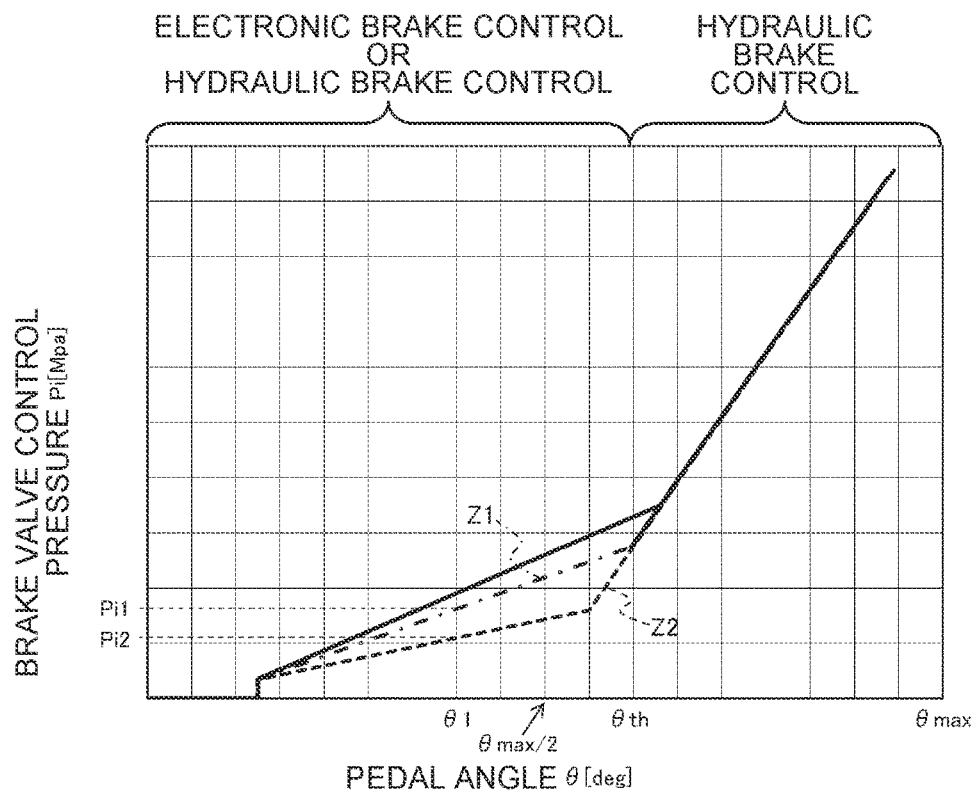
FIG. 6 illustrates a graph showing a first control characteristic and a second control characteristic stored in the controller.

FIG. 6 illustrates, as an example, a graph showing the first control characteristic Z1 by a chain line and a graph showing the second control characteristic Z2 by a broken line, respectively. In the range where the pedal angle θ is equal to or less than half the maximum pedal angle of the brake pedal 43 (θ≤θmax/2), an inclination of the graph of the first control characteristic Z1 is steeper than an inclination of the graph of the second control characteristic Z2, and thus, in the first control characteristic Z1, the brake valve control pressure Pi with respect to a certain pedal angle θ1 is Pi1, whereas, in the second control characteristic Z2, the brake valve control pressure Pi is Pi2 which is less than Pi1 (Pi1>Pi2).

Note that FIG. 6 illustrates the brake control characteristic of the hydraulic brake control by a solid line. In both the first control characteristic Z1 and the second control characteristic Z2 which are the brake control characteristics of the electronic brake control, the inclinations are set to be gentle more than the inclination of the brake control characteristic of the hydraulic brake control.

Furthermore, although not being illustrated in FIG. 6, the other control characteristics are set such that, in the third control characteristic Z3, an inclination of the graph is gentle more than the inclination of the graph of the second control characteristic Z2, in the fourth control characteristic Z4, an inclination of the graph is gentle more than the inclination of the graph of the third control characteristic Z3, in the fifth control characteristic Z5, an inclination of the graph is gentle more than the inclination of the graph of the fourth control characteristic Z4, in the sixth control characteristic Z6, an inclination of the graph is gentle more than the inclination of the graph of the fifth control characteristic Z5, in the seventh control characteristic Z7, an inclination of the graph is gentle more than the inclination of the graph of the sixth control characteristic Z6, and in the eighth control characteristic Z8, an inclination of the graph is gentle more than the inclination of the graph of the seventh control characteristic Z7.

As described above, the controller 5 can arbitrarily adjust the correspondence relation of the brake valve control pressure Pi with respect to the pedal angle θ by using the first to eighth control characteristics Z1 to Z8 so as to output, from the solenoid proportional valve 45, the brake valve control pressure Pi with respect to the pedal angle θ in accordance with the size of the vehicle body, the weight of the load materials in the bucket 23, and/or the operation state of the vehicle body.

If a plurality of control characteristics is not set in the controller 5, the required brake valve control pressure Pi varies depending on a specification of a vehicle body, the weight of load materials, and/or an operation state of the vehicle body. In this case, when the specification of the vehicle body, the weight of the load materials, and/or the operation state of the vehicle body vary, the relation between the pedal angle θ and the step-on force F of the brake pedal 43 also varies in accordance with the brake valve control pressure Pi.

Figure 7:
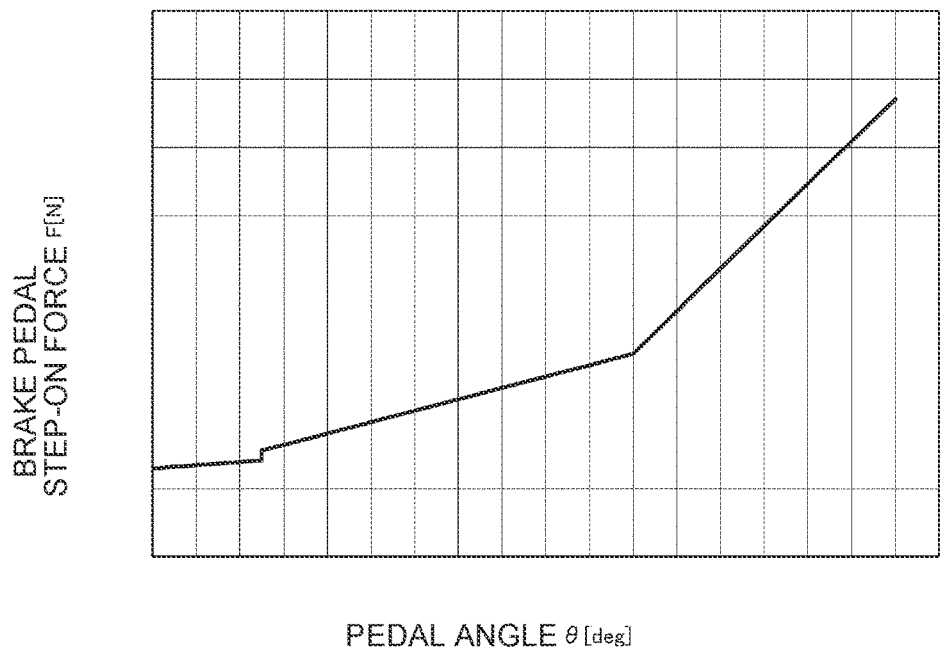
FIG. 7 illustrates a graph showing a relation between an angle and step-on force of a brake pedal.

On the other hand, in the case where the first to eighth control characteristics Z1 to Z8 are set in the controller 5, as illustrated in FIG. 7, even when the specification of the vehicle body, the weight of the load materials, and/or the operation state of the vehicle body vary, the relation between the pedal angle θ and step-on force F of the brake pedal 43 is constant regardless of the brake valve control pressure Pi, and accordingly, the operator can operate the brake devices 41F, 41R without feeling discomfort.

As illustrated in FIG. 5, the controller 5 includes a data acquisition section 51, a vehicle body state determination section 52, a control characteristic selection section 53, a step-on amount determination section 54, a calculation section 55, a command section 56, a selection processing setting section 57, and a storage section 58.

The data acquisition section 51 is configured to acquire a determination signal output from a determination switch 48, which will be described later, and data relating to a lift arm angle α (corresponding to a detected value of the height) detected by the angle sensor 31, a bottom pressure P (corresponding to a detected value of the weight) detected by the bottom pressure sensor 32, a pedal angle θ (corresponding to a detected value of the step-on amount) detected by the potentiometer 33, and a vehicle speed V detected by the vehicle speed sensor 34, respectively.

The vehicle body state determination section 52 is configured to determine an operation state of the vehicle body based on the lift arm angle α, the bottom pressure P, the pedal angle θ, and the vehicle speed V acquired by the data acquisition section 51. Specifically, the vehicle body state determination section 52 determines whether the bottom pressure P acquired by the data acquisition section 51 is equal to or more than a predetermined first threshold value P1, whether the vehicle speed V acquired by the data acquisition section 51 is less than a predetermined second threshold value V1, and whether the lift arm angle α acquired by the data acquisition section 51 is less than a predetermined third threshold value α1, respectively.

The "predetermined first threshold value P1" is a threshold value serving as a reference relating to whether the load materials in the bucket 23 are heavy or light, the "predetermined second threshold value V1" is a threshold value serving as a reference relating to whether the traveling speed of the wheel loader 1 is fast or slow, and the "predetermined third threshold value α1" is a threshold value serving as a reference relating to whether the lifting height of the work device 2 is high or low. Each of the threshold values can be set to an arbitrary value in accordance with a specification of a vehicle body, preference of an operator, or the like.

The control characteristic selection section 53 is configured to select one control characteristic from the first to eighth control characteristics Z1 to Z8 based on the determination result by the vehicle body state determination section 52. A specific method of selection performed by the control characteristic selection section 53 will be described later.

The step-on amount determination section 54 is configured to determine whether the pedal angle θ acquired by the data acquisition section 51 is more than a predetermined switching threshold value θth (predetermined pedal angle θth). The "predetermined switching threshold value θth" is a threshold value serving as a reference for switching the electronic brake control by the controller 5 and the hydraulic brake control using the hydraulic pilot valve 4. In the present embodiment, as illustrated in FIG. 6, the predetermined switching threshold value θth is a value more than half of the maximum pedal angle θmax of the brake pedal 43 (θth>θmax/2).

The calculation section 55 is configured to, in the case where the step-on amount determination section 54 determines that the pedal angle θ is equal to or less than the switching threshold value θth (θ≤θth), calculate the brake valve control pressure Pi corresponding to the pedal angle θ based on the one control characteristic selected by the control characteristic selection section 53.

The command section 56 is configured to, in the case where the step-on amount determination section 54 determines that the pedal angle θ is equal to or less than the switching threshold value θth (θ≤θth), output a switching command current to the solenoid switching valve 47, and output a command current value according to the brake valve control pressure Pi calculated by the calculation section 55 to the solenoid proportional valve 45. The command section 56 is further configured to, in the case where the step-on amount determination section 54 determines that the pedal angle θ is more than the switching threshold value θth (θ>θth), stop the output of the switching command current to the solenoid switching valve 47.

In the present embodiment, the controller 5 stores four different types of selection processing (first to fourth selection processing) which allow the control characteristic selection section 53 to select one control characteristic from the first to eighth control characteristics Z1 to Z8. The operator's cab 12 is provided with the determination switch 48 for determining one type of the selection processing from the first to fourth selection processing, and when the data acquisition section 51 acquires a determination signal output from the determination switch 48, the selection processing setting section 57 sets one type of the selection processing based on the determination signal. The specific processing flows in the first to fourth selection processing will be described later.

The number of types of selection processing for selecting one control characteristic from the plurality of control characteristics is not necessarily four. The controller 5 may store a plurality of types of selection processing, or may store only one type of selection processing.

The storage section 58 is a memory, and stores the first threshold value P1, the second threshold value V1, the third threshold value α1, the switching threshold value θth, the first to eighth control characteristics Z1 to Z8, and the first to fourth selection processing, respectively.

(Processing in Controller 5)

Next, the specific flows of processing executed by the controller 5 will be described with reference to FIG. 8 to FIG. 12.

Figure 8:
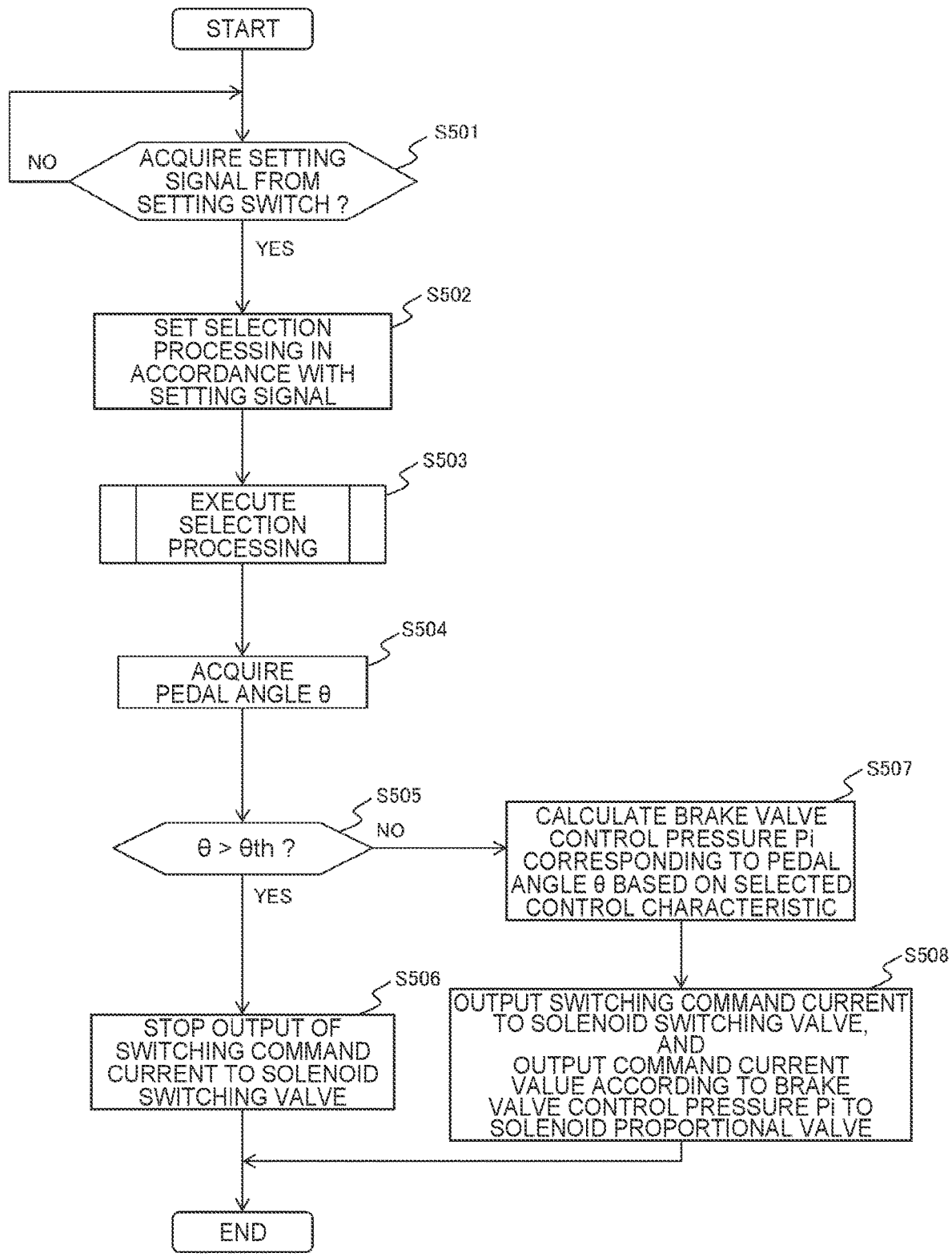
FIG. 8 is a flowchart illustrating a flow of the entire processing executed by the controller according to the first embodiment.
Figure 9B:
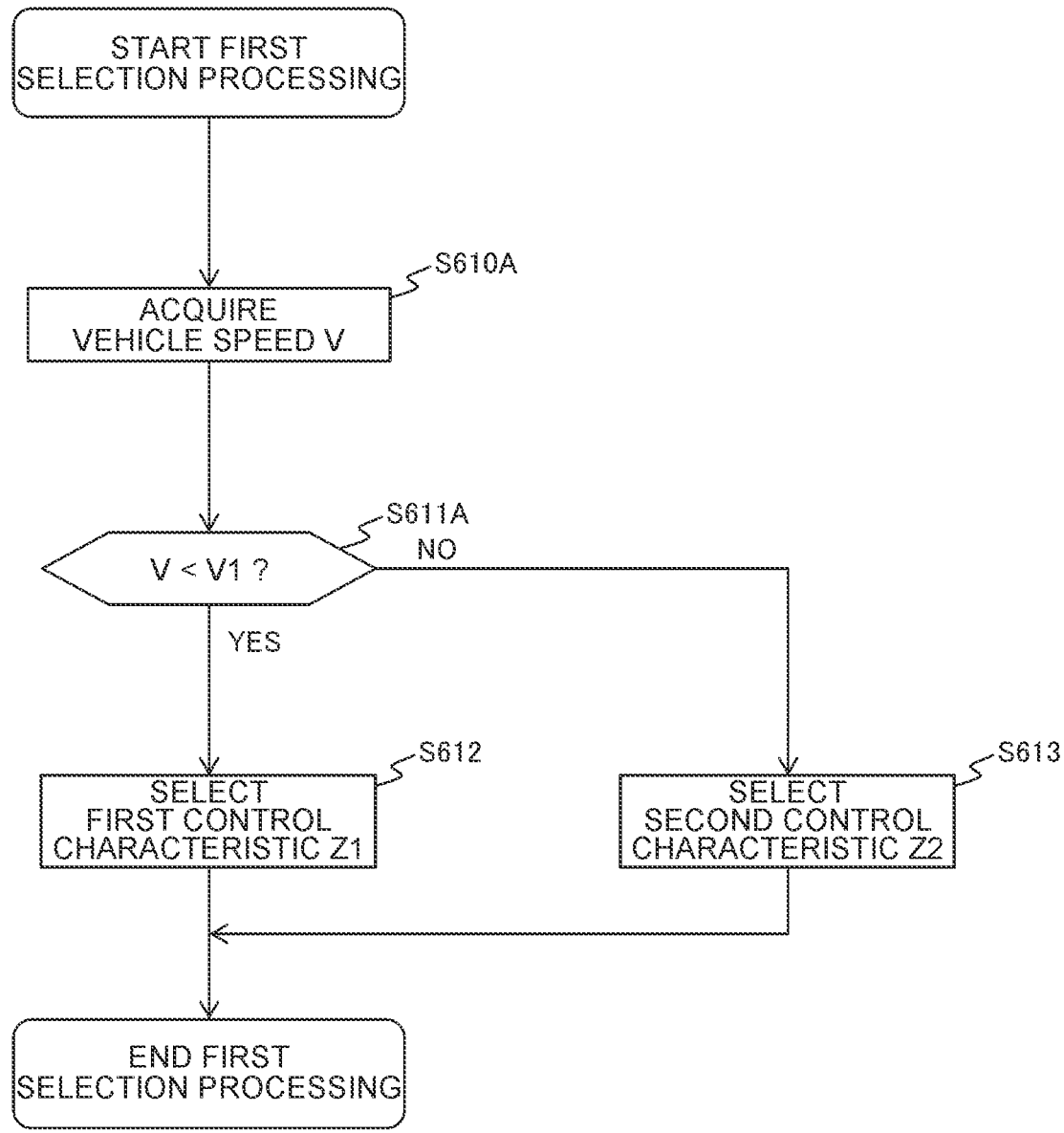
FIG. 9B is a flowchart illustrating a flow of another aspect of the first selection processing.
Figure 10:
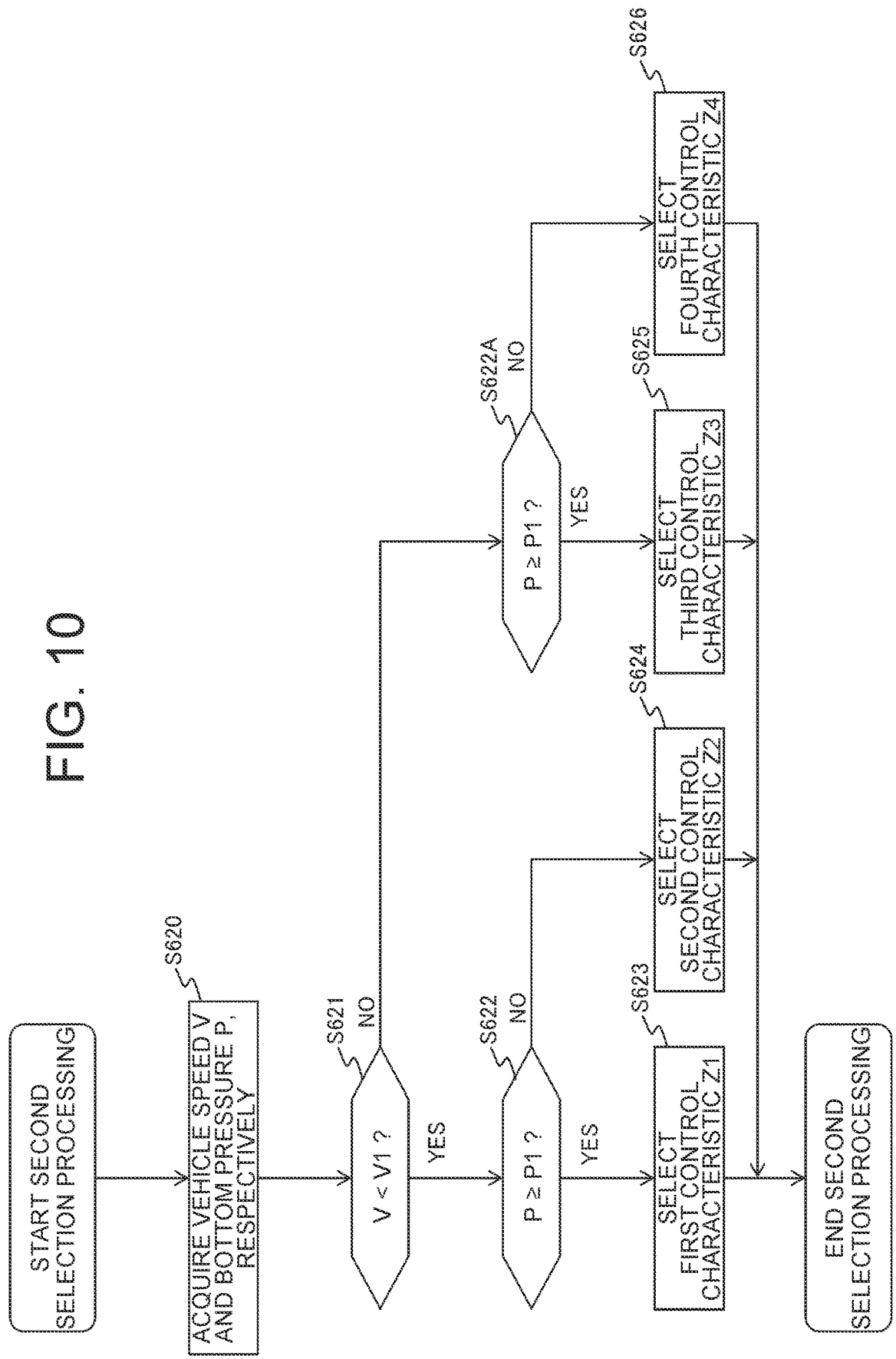
FIG. 10 is a flowchart illustrating a flow of the second selection processing.
Figure 11:
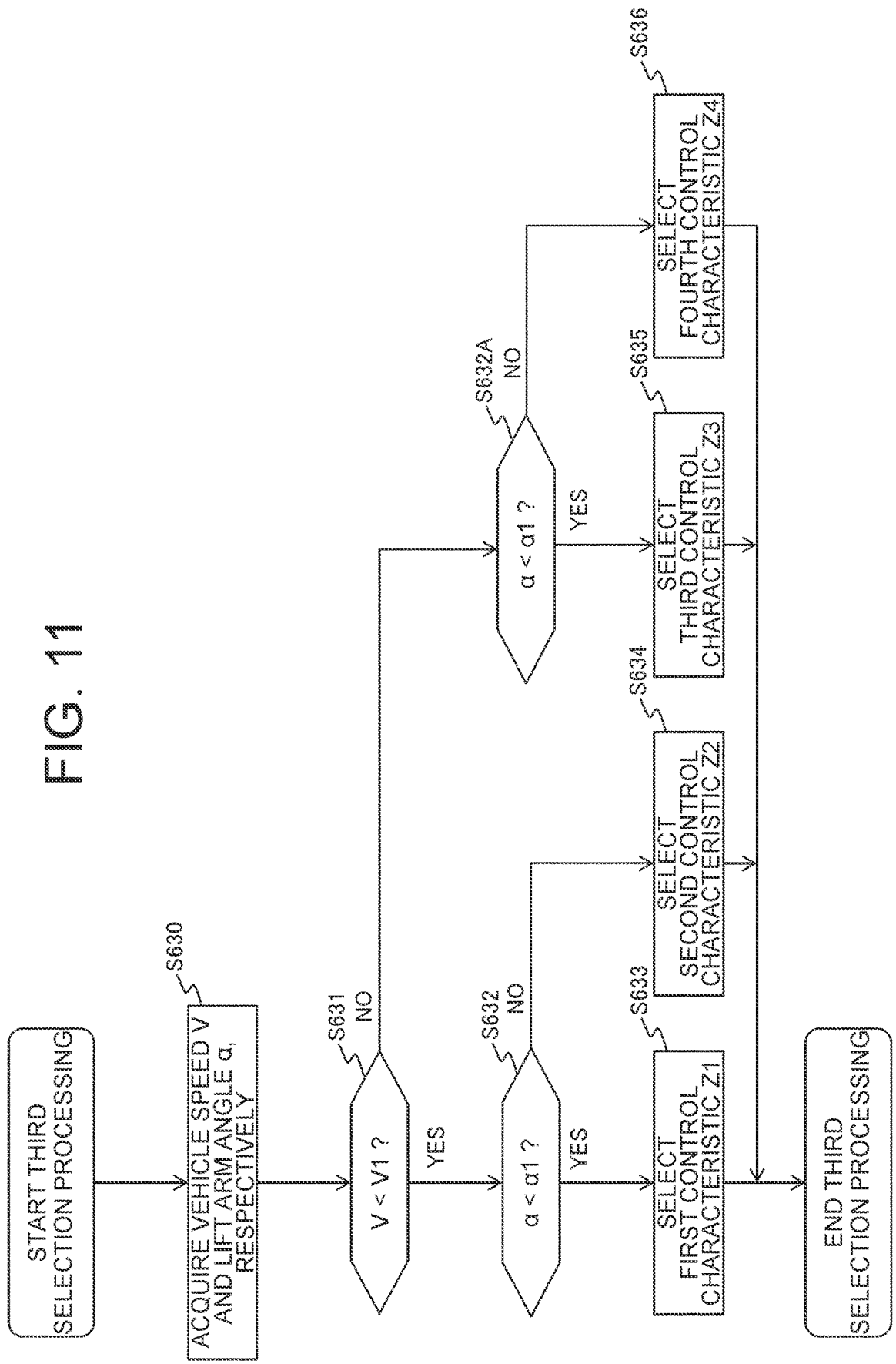
FIG. 11 is a flowchart illustrating a flow of the third selection processing.
Figure 12:
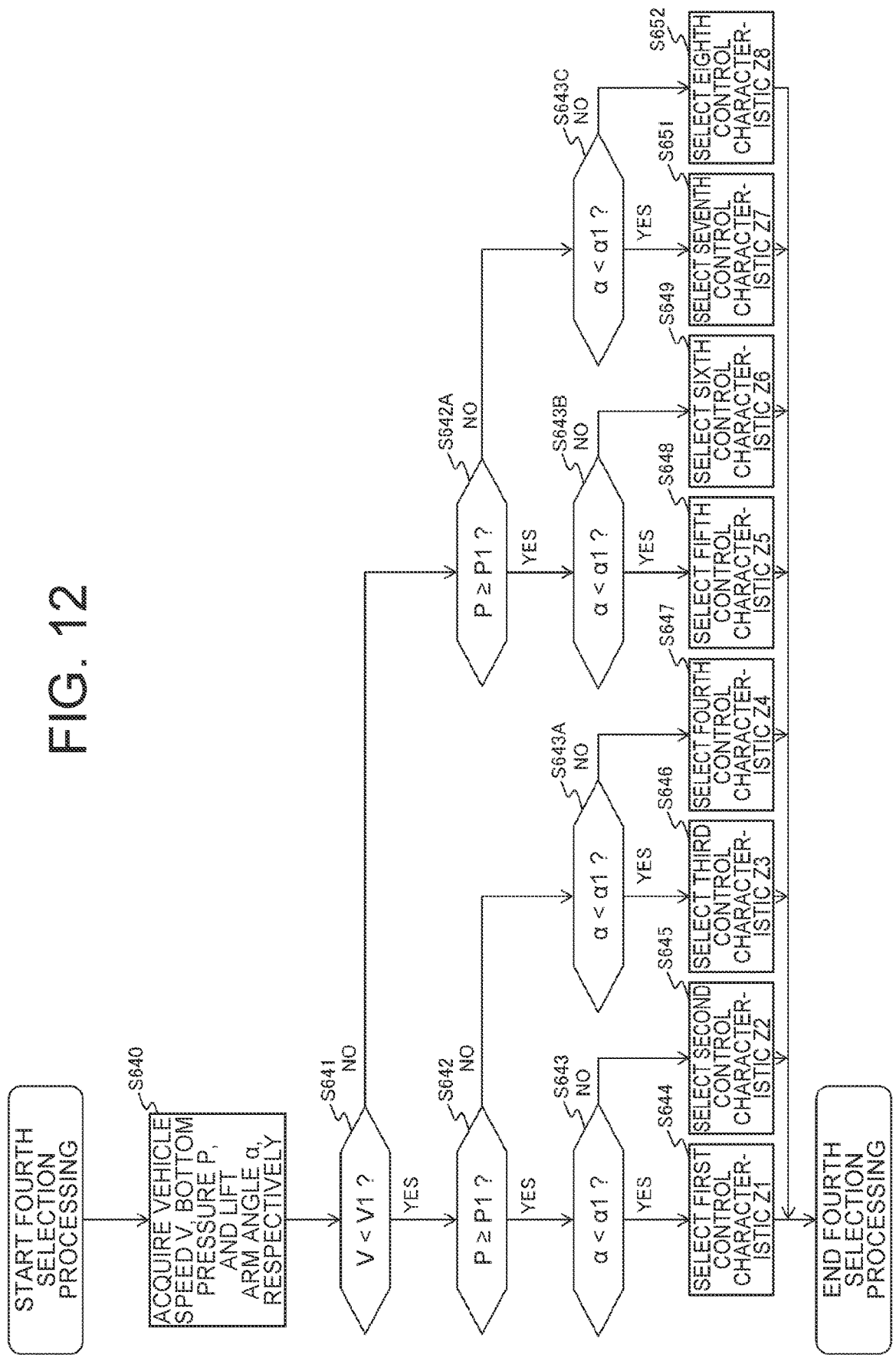
FIG. 12 is a flowchart illustrating a flow of the fourth selection processing.

FIG. 8 is a flowchart illustrating a flow of the entire processing executed by the controller 5. Each of FIG. 9A and FIG. 9B is a flowchart illustrating a flow of the first selection processing. FIG. 10 is a flowchart illustrating a flow of the second selection processing. FIG. 11 is a flowchart illustrating a flow of the third selection processing. FIG. 12 is a flowchart illustrating a flow of the fourth selection processing.

In the present embodiment, firstly, in the controller 5, when the data acquisition section 51 acquires the determination signal from the determination switch 48 (step S501/YES), the selection processing setting section 57 sets one type of the selection processing in accordance with the determination signal acquired in step S501 (step S502). Subsequently, the controller 5 executes the selection processing set in step S502 (step S503).

On the other hand, when the data acquisition section 51 does not acquire the determination signal from the determination switch 48 (step S501/NO), the selection processing setting section 57 cannot set one type of the selection processing from among the first to fourth selection processing.

In the first selection processing, as illustrated in FIG. 9A, firstly, the data acquisition section 51 acquires the bottom pressure P detected by the bottom pressure sensor 32 (step S610). Next, the vehicle body state determination section 52 determines whether the bottom pressure P acquired in step S610 is equal to or more than the first threshold P1 (step S611).

When it is determined in step S611 that the bottom pressure P is equal to or more than the first threshold value P1 (P≥P1) (step S611/YES), the control characteristic selection section 53 selects the first control characteristic Z1 from among the first to eighth control characteristics Z1 to Z8 (step S612), and the controller 5 ends the first selection processing.

On the other hand, when it is determined in step S611 that the bottom pressure P is less than the first threshold value P1 (P<P1) (step S611/NO), the control characteristic selection section 53 selects the second control characteristic Z2 from among the first to eighth control characteristics Z1 to Z8 (step S613), and the controller 5 ends the first selection processing.

In the first selection processing illustrated in FIG. 9A, the first control characteristic Z1 or the second control characteristic Z2 is selected from among the first to eighth control characteristics Z1 to Z8 based on the bottom pressure P detected by the bottom pressure sensor 32, however, the first selection processing is not limited thereto. As illustrated in FIG. 9B, the first control characteristic Z1 or the second control characteristic Z2 may be selected from among the first to eighth control characteristics Z1 to Z8 based on the vehicle speed V detected by the vehicle speed sensor 34.

Specifically, firstly, the data acquisition section 51 acquires the vehicle speed V detected by the vehicle speed sensor 34 (step S610A). Next, the vehicle body state determination section 52 determines whether the vehicle speed V acquired in step S610A is less than the second threshold value V1 (step S611A).

When it is determined in step S611A that the vehicle speed V is less than the second threshold value V1 (V<V1) (step S611A/YES), the control characteristic selection section 53 selects the first control characteristic Z1 from among the first to eighth control characteristics Z1 to Z8 (step S612), and the controller 5 ends the first selection processing.

On the other hand, when it is determined in step S611A that the vehicle speed V is equal to or more than the second threshold value V1 (V≥V1) (step S611A/NO), the control characteristic selection section 53 selects the second control characteristic Z2 from among the first to eighth control characteristics Z1 to Z8 (step S613), and the controller 5 ends the first selection processing.

That is, in the first selection processing, the controller 5 selects one of the first control characteristic Z1 and the second control characteristic Z2 based on either a more or less relation (whether the load materials in the bucket 23 are heavy or light) between the bottom pressure P detected by the bottom pressure sensor 32 and the first threshold value P1, and a more or less relation (whether the vehicle speed is high or slow) between the vehicle speed V detected by the vehicle speed sensor 34 and the second threshold value V1.

In the second selection processing, as illustrated in FIG. 10, firstly, the data acquisition section 51 acquires the vehicle speed V detected by the vehicle speed sensor 34 and the bottom pressure P detected by the bottom pressure sensor 32, respectively (step S620). Next, the vehicle body state determination section 52 determines whether the vehicle speed V acquired in step S620 is less than the second threshold V1 (step S621).

When it is determined in step S621 that the vehicle speed V is less than the second threshold value V1 (V<V1) (step S621/YES), subsequently, the vehicle body state determination section 52 determines whether the bottom pressure P acquired in step S620 is equal to or more than the first threshold value P1 (step S622).

When it is determined in step S622 that the bottom pressure P is equal to or more than the first threshold value P1 (P≥P1) (step S622/YES), the control characteristic selection section 53 selects the first control characteristic Z1 from among the first to eighth control characteristics Z1 to Z8 (step S623), and the controller 5 ends the second selection processing.

On the other hand, when it is determined in step S622 that the bottom pressure P is less than the first threshold value P1 (P<P1) (step S622/NO), the control characteristic selection section 53 selects the second control characteristic Z2 from among the first to eighth control characteristics Z1 to Z8 (step S624), and the controller 5 ends the second selection processing.

Furthermore, when it is determined in step S621 that the vehicle speed V is equal to or more than the second threshold value V1 (V≥V1) (step S621/NO), similarly to step S622, the vehicle body state determination section 52 determines whether the bottom pressure P acquired in step S620 is equal to or more than the first threshold value P1 (step S622A).

When it is determined in step S622A that the bottom pressure P is equal to or more than the first threshold value P1 (P≥P1) (step S622A/YES), the control characteristic selection section 53 selects the third control characteristic Z3 from among the first to eighth control characteristics Z1 to Z8 (step S625), and the controller 5 ends the second selection processing.

On the other hand, when it is determined in step S622A that the bottom pressure P is less than the first threshold value P1 (P<P1) (step S622A/NO), the control characteristic selection section 53 selects the fourth control characteristic Z4 from among the first to eighth control characteristics Z1 to Z8 (step S626), and the controller 5 ends the second selection processing.

In the second selection processing, the controller 5 selects one of the first to fourth control characteristics Z1 to Z4 based on the more or less relation between the bottom pressure P detected by the bottom pressure sensor 32 and the first threshold value P1, in addition to the more or less relation between the vehicle speed V detected by the vehicle speed sensor 34 and the second threshold value V1. That is, the controller 5 selects one of the first to fourth control characteristics Z1 to Z4 based on whether the traveling speed of the wheel loader 1 is high or slow and whether the load materials in the bucket 23 are heavy or light.

In the third selection processing, as illustrated in FIG. 11, firstly, the data acquisition section 51 acquires the vehicle speed V detected by the vehicle speed sensor 34 and the lift arm angle α detected by the angle sensor 31, respectively (step S630). Next, the vehicle body state determination section 52 determines whether the vehicle speed V acquired in step S630 is less than the second threshold value V1 (step S631).

When it is determined in step S631 that the vehicle speed V is less than the second threshold value V1 (V<V1) (step S631/YES), subsequently, the vehicle body state determination section 52 determines whether the lift arm angle α acquired in step S630 is less than the third threshold value α1 (step S632).

When it is determined in step S632 that the lift arm angle α is less than the third threshold value α1 (α<α1) (step S632/YES), the control characteristic selection section 53 selects the first control characteristic Z1 from among the first to eighth control characteristics Z1 to Z8 (step S633), and the controller 5 ends the second selection processing.

On the other hand, when it is determined in step S632 that the lift arm angle α is equal to or more than the third threshold value α1 (α≥α1) (step S632/NO), the control characteristic selection section 53 selects the second control characteristic Z2 from among the first to eighth control characteristics Z1 to Z8 (step S634), and the controller 5 ends the second selection processing.

When it is determined in step S631 that the vehicle speed V is equal to or more than the second threshold value V1 (V≥V1) (step S631/NO), similarly to step S632, the vehicle body state determination section 52 determines whether the lift arm angle α acquired in step S630 is less than the third threshold value α1 (step S632A).

When it is determined in step S632A that the lift arm angle α is less than the third threshold value α1 (α<α1) (step S632A/YES), the control characteristic selection section 53 selects the third control characteristic Z3 from among the first to eighth control characteristics Z1 to Z8 (step S635), and the controller 5 ends the second selection processing.

On the other hand, when it is determined in step S632A that the lift arm angle α is equal to or more than the third threshold value α1 (α≥α1) (step S632A/NO), the control characteristic selection section 53 selects the fourth control characteristic Z4 from among the first to eighth control characteristics Z1 to Z8 (step S636), and the controller 5 ends the second selection processing.

In the third selection processing, the controller 5 selects one of the first to fourth control characteristics Z1 to Z4 based on a more or less relation between the lift arm angle α detected by the angle sensor 31 and the third threshold value α1, in addition to the more or less relation between the vehicle speed V detected by the vehicle speed sensor 34 and the second threshold value V1. That is, unlike the case of the second selection processing, the controller 5 selects one of the first to fourth control characteristics Z1 to Z4 based on whether the traveling speed of the wheel loader 1 is high or slow and whether the lifting height of the work device 2 is high or low.

In the fourth selection processing, as illustrated in FIG. 12, firstly, the data acquisition section 51 acquires the vehicle speed V detected by the vehicle speed sensor 34, the bottom pressure P detected by the bottom pressure sensor 32, and the lift arm angle α detected by the angle sensor 31, respectively (step S640). Next, the vehicle body state determination section 52 determines whether the vehicle speed V acquired in step S640 is less than the second threshold V1 (step S641).

When it is determined in step S641 that the vehicle speed V is less than the second threshold value V1 (V<V1) (step S641/YES), subsequently, the vehicle body state determination section 52 determines whether the bottom pressure P acquired in step S640 is equal to or more than the first threshold value P1 (step S642).

When it is determined in step S642 that the bottom pressure P is equal to or more than the first threshold value P1 (P≥P1) (step S642/YES), the vehicle body state determination section 52 further determines whether the lift arm angle α acquired in step S640 is less than the third threshold value α1 (step S643).

When it is determined in step S643 that the lift arm angle α is less than the third threshold value α1 (α<α1) (step S643/YES), the control characteristic selection section 53 selects the first control characteristic Z1 from among the first to eighth control characteristics Z1 to Z8 (step S644), and the controller 5 ends the fourth selection processing.

On the other hand, when it is determined in step S643 that the lift arm angle α is equal to or more than the third threshold value α1 (α≥α1) (step S643/NO), the control characteristic selection section 53 selects the second control characteristic Z2 from among the first to eighth control characteristics Z1 to Z8 (step S645), and the controller 5 ends the fourth selection processing.

Furthermore, when it is determined in step 642 that the bottom pressure P is less than the first threshold value P1 (P<P1) (step S642/NO), similarly to step S643, the vehicle body state determination section 52 determines whether the lift arm angle α acquired in step S640 is less than the third threshold value α1 (step S643A).

When it is determined in step S643A that the lift arm angle α is less than the third threshold value α1 (α<α1) (step S643A/YES), the control characteristic selection section 53 selects the third control characteristic Z3 from among the first to eighth control characteristics Z1 to Z8 (step S646), and the controller 5 ends the fourth selection processing.

On the other hand, when it is determined in step S643A that the lift arm angle α is equal to or more than the third threshold value α1 (α≥α1) (step S643A/NO), the control characteristic selection section 53 selects the fourth control characteristic Z4 from among the first to eighth control characteristics Z1 to Z8 (step S647), and the controller 5 ends the fourth selection processing.

When it is determined in step S641 that the vehicle speed V is equal to or more than the second threshold V1 (V≥V1) (step S641/NO), similarly to step S642, the vehicle body state determination section 52 determines whether the bottom pressure P acquired in step S640 is equal to or more than the first threshold P1 (step S642A).

When it is determined in step S642A that the bottom pressure P is equal to or more than the first threshold value P1 (P≥P1) (step S642A/YES), similarly to step S643 and step S643A, the vehicle body state determination section 52 determines whether the lift arm angle α acquired in step S640 is less than the third threshold value α1 (step S643B).

When it is determined in step S643B that the lift arm angle α is less than the third threshold value α1 (α<α1) (step S643B/YES), the control characteristic selection section 53 selects the fifth control characteristic Z5 from among the first to eighth control characteristics Z1 to Z8 (step S648), and the controller 5 ends the fourth selection processing.

On the other hand, when it is determined in step S643B that the lift arm angle α is equal to or more than the third threshold value α1 (α≥α1) (step S643B/NO), the control characteristic selection section 53 selects the sixth control characteristic Z6 from among the first to eighth control characteristics Z1 to Z8 (step S649), and the controller 5 ends the fourth selection processing.

Furthermore, when it is determined in step S642A that the bottom pressure P is less than the first threshold value P1 (P<P1) (step S642A/NO), similarly to step S643, step S643A, and step S643B, the vehicle body state determination section 52 determines whether the lift arm angle α acquired in step S640 is less than the third threshold value α1 (step S643C).

When it is determined in step S643C that the lift arm angle α is less than the third threshold value α1 (α<α1) (step S643C/YES), the control characteristic selection section 53 selects the seventh control characteristic Z7 from among the first to eighth control characteristics Z1 to Z8 (step S651), and the controller 5 ends the fourth selection processing.

On the other hand, when it is determined in step S643C that the lift arm angle α is equal to or more than the third threshold value α1 (α≥α1) (step S643C/NO), the control characteristic selection section 53 selects the eighth control characteristic Z8 from among the first to eighth control characteristics Z1 to Z8 (step S652), and the controller 5 ends the fourth selection processing.

In the fourth selection processing, the controller 5 selects one of the first to eighth control characteristics Z1 to Z8 based on the more or less relation between the vehicle speed V detected by the vehicle speed sensor 34 and the second threshold value V1, the more or less relation between the bottom pressure P detected by the bottom pressure sensor 32 and the first threshold value P1, and the more or less relation between the lift arm angle α detected by the angle sensor 31 and the third threshold value α1. That is, the controller 5 selects one of the first to eighth control characteristics Z1 to Z8 based on every factor relating to the dump approach operation of the wheel loader 1 (whether the traveling speed of the wheel loader 1 is high or slow, whether the weight of the load materials in the bucket 23 is heavy or light, and whether the lifting height of the work device 2 is high or low).

As described above, the controller 5 stores the first to fourth selection processing which are different to each other in the methods of selecting one control characteristic from among the first to eighth control characteristics Z1 to Z8, and the operator can set the optimum one type of the selection processing from among the first to fourth selection processing by considering the working state and the traveling state, thereby enabling the wheel loader 1 to efficiently control the brake with high accuracy.

As illustrated in FIG. 8, when the control characteristic selection section 53 selects one control characteristic in step S503, subsequently, the data acquisition section 51 acquires the pedal angle θ detected by the potentiometer 33 (step S504). Next, the step-on amount determination section 54 determines whether the pedal angle θ acquired in step S504 is more than the switching threshold value θth (step S505).

When it is determined in step S505 that the pedal angle θ is more than the switching threshold value θth (θ>θth) (step S505/YES), the command section 56 stops the output of the switching command current to the solenoid switching valve 47 (step S506), and the processing in the controller 5 is completed. Thus, the solenoid switching valve 47 is switched to the second switching position 47B so that the pilot pressure generated by the hydraulic pilot valve 46 is applied to the brake valve 44.

On the other hand, when the step-on amount determination section 54 determines in step S505 that the pedal angle θ is equal to or less than the switching threshold value θth (θ≤θth) (step S505/NO), the calculation section 55 calculates the brake valve control pressure Pi corresponding to the pedal angle θ based on the one control characteristic selected in step S503 (step S507).

Then, the command section 56 outputs a switching command current to the solenoid switching valve 47 and outputs a command current value according to the brake valve control pressure Pi calculated in step S507 to the solenoid proportional valve 45 (step S508), and the processing in the controller 5 is completed.

Second Embodiment

Figure 13:
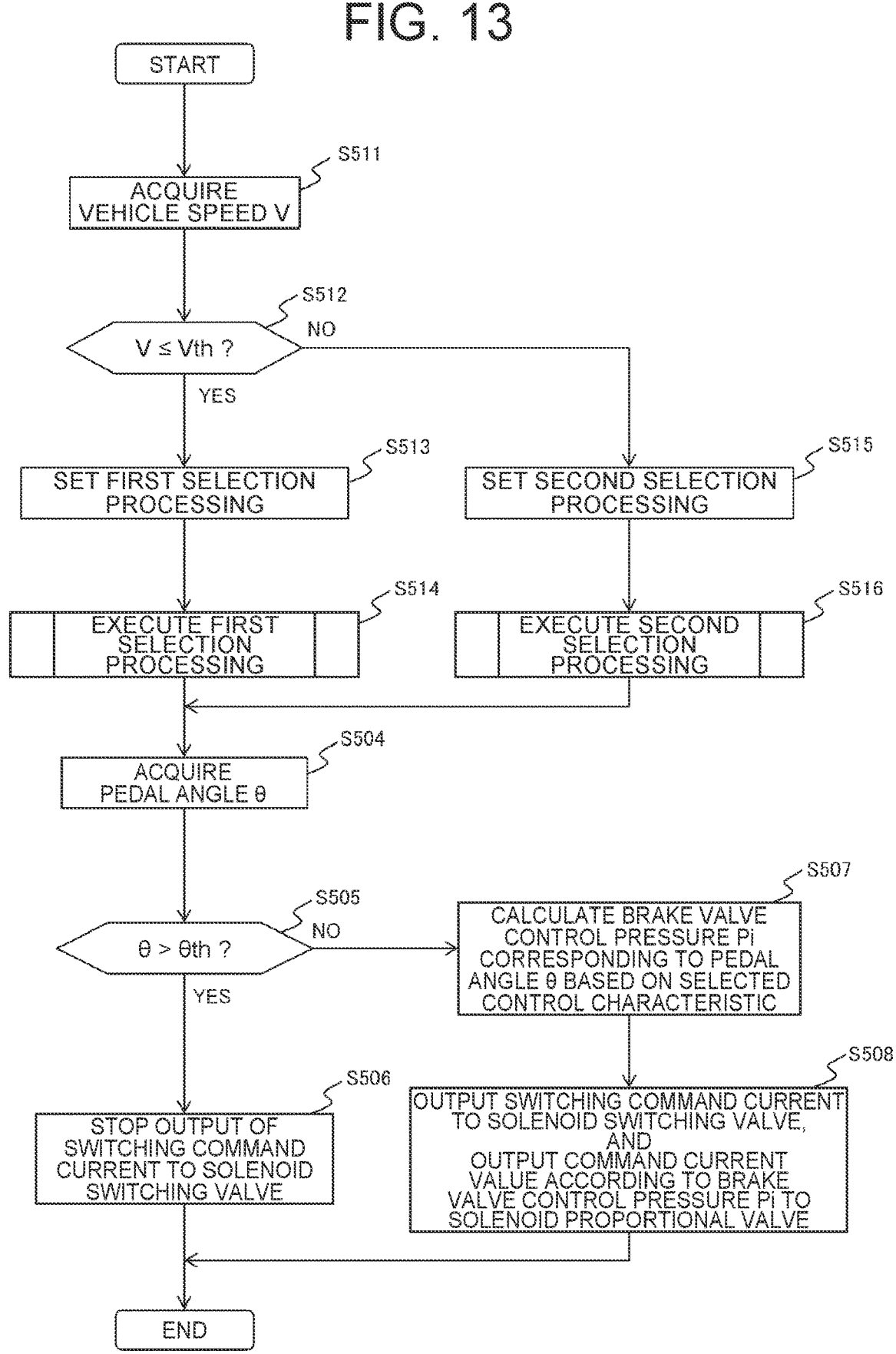
FIG. 13 is a flowchart illustrating a flow of the entire processing executed by a controller according to the second embodiment.

Next, a controller 5A according to a second embodiment of the present invention will be described with reference to FIG. 13. In FIG. 13, the constituent elements common to those described for the brake control system according to the first embodiment are provided with the same reference signs, and explanation therefor is omitted. This is also applied to the third embodiment.

FIG. 13 is a flowchart illustrating a flow of the entire processing executed by the controller 5A according to the second embodiment.

The controller 5A according to the present embodiment differs from the controller 5 according to the first embodiment in the method of determining one type of selection processing from among the first to fourth selection processing. Specifically, firstly, the data acquisition section 51 acquires the vehicle speed V detected by the vehicle speed sensor 34 (step S511). Next, the selection processing setting section 57 determines whether the vehicle speed V acquired in step S511 is equal to or less than a determination threshold value Vth (step S512).

The "determination threshold value Vth" is a value more than the second threshold V1 (Vth>V1), which is the vehicle speed serving as a reference for determining whether which factors, namely, the vehicle speed, the weight of load materials, and the height of the lift arm 21, is to be considered at the time when the controller 5 selects one control characteristic.

When it is determined in step S512 that the vehicle speed V is equal to or less than the determination threshold value Vth (V≤Vth) (step S512/YES), the selection processing setting section 57 sets, for example, the first selection processing from among the first to fourth selection processing (step S513). When the first selection processing is set in step S513, the controller 5A executes the first selection processing (step S514).

On the other hand, when it is determined in step S512 that the vehicle speed V is more than the determination threshold value Vth (V>Vth) (step S512/NO), the selection processing setting section 57 sets, for example, the second selection processing from among the first to fourth selection processing (step S515). When the second selection processing is set in step S515, the controller 5A executes the second selection processing (step S516).

As described above, the controller 5A may be configured to determine the traveling state of the wheel loader 1 in order to set one type of the selection processing from among the first to fourth selection processing. In this case, it is not necessary to provide the determination switch 48 which is provided in the first embodiment, and thus the controller 5A can automatically set the selection processing.

In FIG. 13, the selection processing setting section 57 sets either the first selection processing or the second selection processing based on the vehicle speed, however, it is not limited thereto. As long as the executed processing is configured to set one type of the selection processing from among the first to fourth selection processing, the determination threshold value Vth may be arbitrarily set in accordance with the working state of the wheel loader 1 or the like.

Third Embodiment

Next, a brake control system according to a third embodiment of the present invention will be described with reference to FIG. 14.

Figure 14:
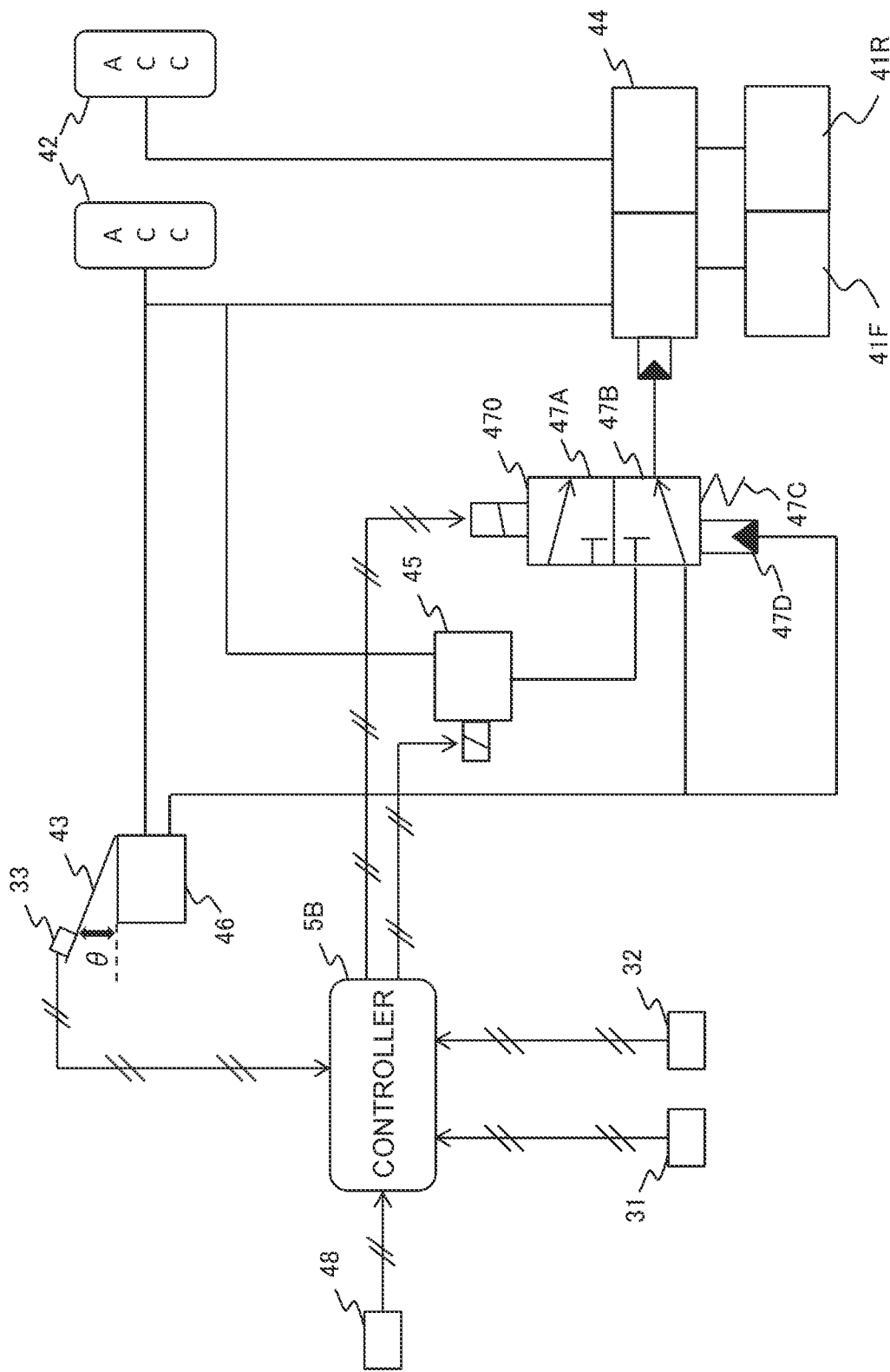
FIG. 14 is a system configuration diagram illustrating a configuration example of a brake control system according to the third embodiment.

FIG. 14 is a system configuration diagram illustrating a configuration example of a brake control system according to the third embodiment.

In the first embodiment, as an example of the case where an abnormality occurs in the electric system in the brake control system, the case where a signal line connecting the controller 5 and the solenoid proportional valve 45 is disconnected or the case where the output of the command current from the controller 5 is terminated has been described. In the third embodiment, as another example of the case where an abnormality occurs in the electric system in the brake control system, the case where the software in a controller 5B is out of control and thus the command current continues to be output to the solenoid proportional valve 45 and a solenoid switching valve 470 will be described.

For example, in the case where the switching command current more than the urging force of the spring 47C in the solenoid switching valve 470 continues to be output from the controller 5B to the solenoid switching valve 470, the solenoid switching valve 470 remains switched to the first switching position 47A. In this case, the brake valve 44 will continue to be controlled by the brake valve control pressure Pi from the solenoid proportional valve 45, and thus the hydraulic brake control using the hydraulic pilot valve 46 cannot be performed.

With this regard, unlike the configuration of the solenoid switching valve 47 of the first embodiment, the solenoid switching valve 470 includes a pilot oil chamber 47D configured to cause the hydraulic pressure to be applied in the same direction as the urging force of the spring 47C. The pilot oil chamber 47D is connected to the hydraulic pilot valve 46 which receives the pilot pressure generated by the hydraulic pilot valve 46.

Accordingly, the solenoid switching valve 470 is switched to the first switching position 47A when the switching command current more than the combined force of the urging force of the spring 47C and the pilot pressure applied to the pilot oil chamber 47D is applied. The pilot pressure which is set for the pilot oil chamber 47D may be arbitrarily set.

As described above, in the case where there is a possibility that the software in the controller 5B is out of control, when the operator strongly steps on the brake pedal 43 so as to cause the hydraulic pilot valve 46 to generate the pilot pressure more than the set pilot pressure of the solenoid switching valve 470, the solenoid switching valve 470 can be switched from the first switching position 47A to the second switching position 47B. As a result, the pilot pressure generated by the hydraulic pilot valve 46 is applied to the brake valve 44.

In the above, the embodiments of the present invention have been descried. The present invention is not limited to the embodiments described above, and includes various modifications. For example, the embodiments described above have been explained in detail in order to clarify the present invention, but are not necessarily limited to those having all the configurations described. In addition, a part of the configuration of one embodiment of the present invention can be replaced with that of other embodiments, and the configuration of other embodiments can be added to the configuration of the one embodiment. Furthermore, it is possible to add, delete, or replace another configuration with respect to a part of the configuration of the present embodiments.

For example, in the embodiments described above, the wheel loader 1 has been described as an aspect of work vehicles, however, the present invention is not limited thereto. The present invention can be applied to other work vehicles such as forklifts. Meanwhile, the present invention is particularly effective in the case of the wheel loader 1 which performs the work of loading load materials in the work device 2 into the dump truck 102 or a hopper while climbing a slope.

Furthermore, in the embodiments described above, the controller 5, 5A, 5B determines whether the pedal angle θ detected by the potentiometer 33 is less than the predetermined pedal angle θth (switching threshold value θth) after executing the selection processing, however, the present invention is not limited thereto. The controller 5, 5A, 5B may be configured to execute the selection processing after making this determination and determining that the pedal angle θ is less than the predetermined pedal angle θth (θ≤θth). When the pedal angle θ detected by the potentiometer 33 is equal to or less than the predetermined pedal angle θth (switching threshold value θth) and one control characteristic is selected from among the first to eighth control characteristics Z1 to Z8, the controller 5, 5A, 5B may calculate the brake valve control pressure Pi corresponding to the pedal angle θ based on the one control characteristic.

REFERENCE SIGNS LIST

1: wheel loader (work vehicle)
2: work device
5, 5A, 5B: controller
11, 11A: front wheel (wheels)
11, 11B: rear wheel (wheels)
12: operator's cab
31: angle sensor (height sensor)
32: bottom pressure sensor (load sensor)
33: potentiometer (step-on amount sensor)
34: vehicle speed sensor
41F, 41R brake device
43: brake pedal
44: brake valve
45: solenoid proportional valve
46: hydraulic pilot valve
47: solenoid switching valve
47A: first switching position
47B: second switching position
setting switch
P: bottom pressure (weight)
Pi: brake valve control pressure (control pressure)
V: vehicle speed
Z1-Z8: first to eighth control characteristics
α: lift arm angle
θ: pedal angle
θth: switching threshold value (predetermined step-on amount)

The invention claimed is:

1. A work vehicle comprising:
a plurality of wheels provided on a vehicle body;
a work device provided on a front portion of the vehicle body to perform operations of moving and loading load materials;
a brake device configured to apply a brake force to the plurality of wheels;
a brake pedal for operating the brake device;
a brake valve configured to control a brake pressure to be output to the brake device based on a step-on amount of the brake pedal;
a solenoid proportional valve configured to output a pilot pressure to the brake valve; and
a controller configured to control the solenoid proportional valve,
wherein
the work vehicle further comprises:
a step-on amount sensor configured to detect the step-on amount of the brake pedal;
a vehicle speed sensor configured to detect a vehicle speed; and
a load sensor configured to detect a weight of the load materials loaded in the work device,
the controller stores a plurality of control characteristics each of which is set such that a control pressure of the solenoid proportional valve increases as the step-on amount of the brake pedal increases, and in a case where the step-on amount is equal to or less than a predetermined step-on amount, an increase rate of the control pressure of the solenoid proportional valve with respect to the step-on amount of the brake pedal varies, and
the controller is further configured to:
in a case where the step-on amount detected by the step-on amount sensor is equal to or less than the predetermined step-on amount, select one control characteristic from among the plurality of control characteristics based on at least one of the vehicle speed detected by the vehicle speed sensor and the weight detected by the load sensor;
calculate the control pressure corresponding to the step-on amount detected by the step-on amount sensor based on the selected one control characteristic; and
output a command current value according to the calculated control pressure to the solenoid proportional valve.

2. The work vehicle according to claim 1, further comprising a height sensor configured to detect a height of the work device,
wherein the controller selects the one control characteristic from among the plurality of control characteristics which has been stored based on the vehicle speed detected by the vehicle speed sensor, the weight detected by the load sensor, and the height detected by the height sensor.

3. The work vehicle according to claim 1, wherein
the controller stores a plurality of different types of selection processing for selecting the one control characteristic from among the plurality of control characteristics, the work vehicle further comprises a determination switch for determining one type of the selection processing from among the plurality of different types of selection processing, and the controller sets the one type of the selection processing based on a determination signal output from the determination switch.

4. The work vehicle according to claim 1, wherein the controller stores a plurality of different types of selection processing for selecting the one control characteristic from among the plurality of control characteristics, and the controller sets the one type of the selection processing based on the vehicle speed detected by the vehicle speed sensor.

5. The work vehicle according to claim 1, further comprising:

a hydraulic pilot valve configured to generate a pilot pressure corresponding to the step-on amount of the brake pedal; and a solenoid switching valve including a first switching position for guiding the control pressure of the solenoid proportional valve to the brake valve, and a second switching position for guiding the pilot pressure generated by the hydraulic pilot valve to the brake valve, wherein the controller stops output of a switching command current to the solenoid switching valve so as to switch the solenoid switching valve to the second switching position in a case where the step-on amount detected by the step-on amount sensor is more than the predetermined step-on amount of the brake pedal.

6. The work vehicle according to claim 1, further comprising:

a hydraulic pilot valve configured to generate a pilot pressure corresponding to the step-on amount of the brake pedal; and a solenoid switching valve including a first switching position for guiding the control pressure of the solenoid proportional valve to the brake valve, and a second switching position for guiding the pilot pressure generated by the hydraulic pilot valve to the brake valve, wherein in a case where an abnormality occurs in an electric system including the controller, the solenoid switching valve is switched to the second switching position.

7. The work vehicle according to claim 1, wherein the brake valve is disposed on a position different from a position of the brake pedal provided in an operator's cab, which is closer to an axle than the operator's cab.

* * * * *